(12) United States Patent
Kodgule et al.

(10) Patent No.: US 10,024,211 B2
(45) Date of Patent: Jul. 17, 2018

(54) MOUNTING SUPPORT FOR HEAT SHIELD REINFORCEMENT

(71) Applicant: Cummins Emission Solutions, Inc., Columbus, IN (US)

(72) Inventors: Nikhil S. Kodgule, Columbus, IN (US); Michael Lynch, Mineral Point, WI (US); Ryan Robert Welch, Wauwatosa, WI (US); Patrick Thelen, McFarland, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 141 days.

(21) Appl. No.: 15/140,743

(22) Filed: Apr. 28, 2016

(65) Prior Publication Data
US 2016/0305299 A1 Oct. 20, 2016

Related U.S. Application Data

(63) Continuation-in-part of application No. 29/524,215, filed on Apr. 17, 2015, now Pat. No. Des. 807,726.

(30) Foreign Application Priority Data

Apr. 29, 2015 (CN) ..................... 2015 2 0269542 U

(51) Int. Cl.
*F01N 3/10* (2006.01)
*F01N 3/20* (2006.01)
(Continued)

(52) U.S. Cl.
CPC ......... *F01N 3/2066* (2013.01); *F01N 3/2839* (2013.01); *F01N 13/143* (2013.01);
(Continued)

(58) Field of Classification Search
CPC .... F01N 13/185; F01N 13/143; F01N 3/2066; F01N 3/2839
(Continued)

(56) References Cited

U.S. PATENT DOCUMENTS

| D28,301 S | 2/1898 | Gurnee |
|---|---|---|
| 2,683,579 A | 7/1954 | Wallace |

(Continued)

FOREIGN PATENT DOCUMENTS

| GB | 1 531 916 | 11/1978 |
|---|---|---|
| WO | WO 2006/018550 | 2/2006 |

OTHER PUBLICATIONS

Notice of Allowance issued for Design U.S. Appl. No. 29/524,215, dated Sep. 30, 2017, 7 pages.
(Continued)

*Primary Examiner* — Tom P Duong
(74) *Attorney, Agent, or Firm* — Foley & Lardner LLP

(57) ABSTRACT

An aftertreatment system comprises a SCR system. The SCR system includes a housing having an inlet, an outlet and defining an internal volume. At least one catalyst can be positioned within the internal volume. A mounting support is positioned around at least a portion of a perimeter of the housing. A heat shield is positioned around the perimeter of the housing such that the housing is positioned substantially within the heat shield. A portion of the heat shield is disposed on and in contact with the mounting support. A clamp is positioned around a heat shield perimeter. The clamp is positioned on the portion of the heat shield disposed on and in contact with the mounting support. The mounting support is configured to transmit a clamping force of the clamp on the heat shield to the housing to prevent buckling of the heat shield from the clamping force.

33 Claims, 5 Drawing Sheets

(51) Int. Cl.
*F01N 3/28* (2006.01)
*F01N 13/14* (2010.01)
*F01N 13/18* (2010.01)
*B01D 53/94* (2006.01)

(52) U.S. Cl.
CPC ........ *F01N 13/185* (2013.01); *B01D 53/9431* (2013.01); *Y02T 10/24* (2013.01)

(58) Field of Classification Search
USPC .......................................... 422/168, 179, 180
See application file for complete search history.

(56) References Cited

U.S. PATENT DOCUMENTS

| | | |
|---|---|---|
| D285,044 S | 8/1986 | Mockett |
| D285,109 S | 8/1986 | Jornhagen |
| D285,247 S | 8/1986 | Jornhagen |
| D289,078 S | 3/1987 | Vassallo et al. |
| D356,456 S | 3/1995 | Henry |
| D362,902 S | 10/1995 | Reiber |
| 5,496,069 A | 3/1996 | Milligan |
| D534,253 S | 12/2006 | Sandman et al. |
| D536,071 S | 1/2007 | Wortmann et al. |
| D548,048 S | 8/2007 | Sherrard |
| D556,866 S | 12/2007 | Darce |
| D557,771 S | 12/2007 | Darce |
| D560,469 S | 1/2008 | Bartol et al. |
| D574,934 S | 8/2008 | Darce |
| D614,272 S | 4/2010 | Henry et al. |
| D648,427 S | 11/2011 | Bowman et al. |
| D655,797 S | 3/2012 | Muramatsu |
| D696,751 S | 12/2013 | Beagen, Jr. |
| D706,908 S | 6/2014 | Knapp |
| D715,412 S | 10/2014 | Sgherri |
| D724,424 S | 3/2015 | Wilk |
| D728,757 S | 5/2015 | Graham |
| D737,415 S | 8/2015 | Sato et al. |
| D767,565 S | 9/2016 | Francis et al. |
| D785,144 S | 4/2017 | Kitagawa |
| 2006/0067860 A1* | 3/2006 | Faircloth, Jr. ......... F01N 3/0211 422/171 |
| 2008/0136172 A1 | 6/2008 | Roe et al. |
| 2015/0061286 A1 | 3/2015 | Niaz |
| 2016/0305299 A1 | 10/2016 | Kodgule et al. |

OTHER PUBLICATIONS

Search Report for United Kingdom Patent Application No. GB 1606309.1, dated Oct. 4, 2016, 3 pages.

\* cited by examiner

MOUNTING SUPPORT FOR HEAT SHIELD REINFORCEMENT

CROSS-REFERENCE TO RELATED APPLICATIONS

The present application is a continuation in part of U.S. Design patent application Ser. No. 29/524,215, filed Apr. 17, 2015. This application also claims priority to Chinese Utility Model Application No. 201520269542.9, now Chinese Utility Model No. ZL201520269542.9, which was filed on Apr. 29, 2015. The contents of both applications are incorporated herein by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Conventional SCR systems generally include a heat shield positioned around a housing of the SCR system. The heat shield is configured to prevent heat loss from the SCR system so that one or more catalysts of the SCR system can be maintained at a desired temperature to allow optimal reduction of the exhaust gas. The heat shield can be spaced apart from the housing, to minimize conductive heat transfer. A thickness of the heat shield can also be substantially thinner than a thickness of the housing. The heat shield is therefore prone to buckling due to force exerted by one or more clamps on the heat shield which are conventionally used to mount the SCR system on a structure (e.g., a chassis of a vehicle or industrial equipment).

SUMMARY

Embodiments described herein relate generally to aftertreatment systems for use with internal combustion (IC) engines. Embodiments described herein particularly relate to aftertreatment systems that include a mounting support positioned between a heat shield and a housing of an SCR system of the aftertreatment system and configured to provide structural support to the heat shield.

In a first set of embodiments, an aftertreatment system comprises a SCR system. The SCR system includes a housing having an inlet, an outlet and defines an internal volume. A mounting support is positioned around at least a portion of a perimeter of the housing. A heat shield is positioned around the perimeter of the housing such that the housing is positioned substantially within the heat shield. A portion of the heat shield is disposed on and in contact with the mounting support. A clamp is positioned around a heat shield perimeter. The clamp is positioned on the portion of the heat shield disposed on and in contact with the mounting support. The mounting support is configured to transmit a clamping force of the clamp on the heat shield to the housing to prevent buckling of the heat shield from the clamping force.

In a second set of embodiments, an aftertreatment system comprises a SCR system. The SCR system includes a housing having an inlet, an outlet and defining an internal volume. A first mounting support is positioned around at least a portion of a perimeter of the housing. A second mounting support is also positioned around at least a portion of the perimeter of the housing adjacent to and spaced apart from the first mounting support. A heat shield is positioned around the perimeter of the housing such that the housing is positioned substantially within the heat shield. A first portion of the heat shield is disposed on and in contact with the first mounting support, and a second portion of the heat shield is disposed on and in contact with the second mounting support. A first clamp is positioned around a heat shield perimeter on the first portion of the heat shield. A second clamp is positioned around the heat shield perimeter on the second portion of the heat shield. The first mounting support and the second mounting support are configured to transmit a clamping force of the first clamp and the second clamp on the heat shield to the housing respectively to prevent buckling of the heat shield from the clamping force.

In a third set of embodiments, an aftertreatment system comprises a SCR system. The SCR system includes a housing having an inlet, an outlet, and defining an internal volume. A mounting support is positioned concentrically around the housing. The mounting support is shaped in the form of a circular ring. A heat shield is positioned concentrically around the housing such that substantially all of the housing is positioned within the heat shield. A portion of the heat shield is disposed on and in contact with the mounting support. The mounting support is configured to transmit a clamping force applied on a portion of the heat shield disposed on the mounting support to the housing thereby, preventing buckling of the heat shield from the clamping force.

In a fourth set of embodiments, an aftertreatment system comprises a selective catalytic reduction system, including a housing having an inlet, an outlet and defining an internal volume. A first mounting support is positioned concentrically around the housing. The first mounting support is shaped in the form of a circular ring. A second mounting support is positioned concentrically around the housing. The second mounting support is also shaped in the form of a circular ring. The second mounting support is positioned adjacent to and spaced apart from the first mounting support. A heat shield is positioned concentrically around the housing such that substantially all of the housing is positioned within the heat shield. A first portion of the heat shield is disposed on and in contact with the first mounting support and a second portion of the heat shield is disposed on and in contact with the second mounting support. The first mounting support and the second mounting support are configured to transmit a clamping force applied by one or more clamps on the first portion and the second portion of the heat shield to the housing to prevent buckling of the heat shield from the clamping force.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
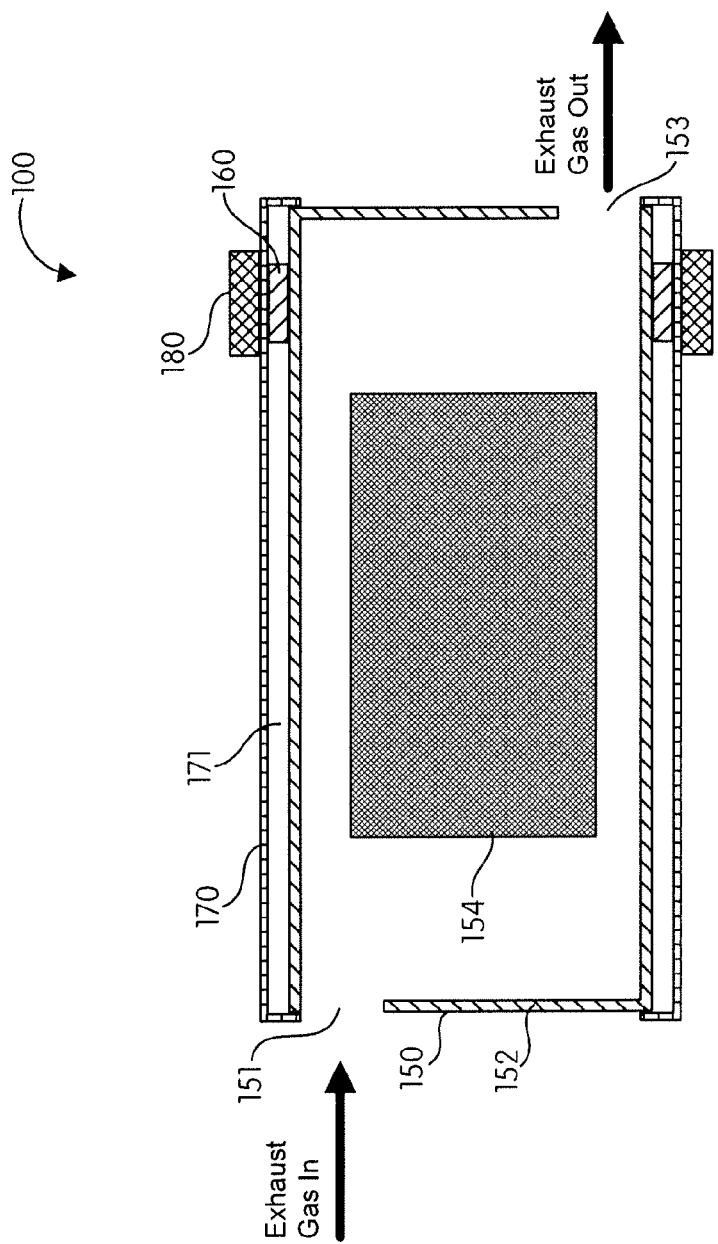
FIG. 1 is a schematic illustration of a side cross-section of an aftertreatment system that includes an SCR system having a housing, and a mounting support positioned between a heat shield which is mounting on the housing, and the housing, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to aftertreatment systems for use with IC engines. Embodiments described herein particularly relate to aftertreatment systems that include a mounting support positioned between a heat shield and a housing of an SCR system of the aftertreatment system to provide structural support to the heat shield.

Embodiments described herein provide benefits including, for example: (1) providing structural support to a heat shield positioned around a housing of an SCR system to prevent buckling of the heat shield due to a clamping force of clamps used to secure the housing; (2) providing a circular ring or a plurality of partial-circular (e.g., two semi-circular pieces, four circular quadrants or any number of pieces) as the mounting support which can easily slide on, or mounted on the housing for positioning between the housing and the heat shield; (3) having compatibility with conventional aftertreatment systems such that the mounting support can be included in the conventional aftertreatment system without any modifications to the housing or heat shields included in the conventional aftertreatment systems.

FIG. 1 is a schematic illustration of a side cross section of an aftertreatment system 100. The aftertreatment system 100 includes an SCR system 150, a mounting support 160, a heat shield 170 and a clamp 180. The aftertreatment system 100 is configured to receive an exhaust gas (e.g., a diesel exhaust gas) from an IC engine (e.g. a diesel engine) and treat the exhaust gas.

The SCR system 150 includes a housing 152 defining an internal volume. The housing 152 has an inlet 151 for receiving the exhaust gas and an outlet 153 for expelling treated exhaust gas. At least one catalyst 154 is disposed within the housing 152 and is formulated to selectively reduce constituents (e.g., NOx gases) included in the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The housing 152 can have any suitable cross-section for example, circular, square, rectangular, oval, etc.

A mounting support 160 is positioned around at least a portion of a perimeter of the housing 152. In one embodiment, the mounting support 160 includes a C-shaped member which is positioned around a portion of the perimeter of the housing 152. In particular embodiments, the has a circular cross-section so that the perimeter of the housing 152 includes a circumference. In such embodiments, the mounting support 160 can include a circular ring shaped member which is positioned concentrically around the circumference of the housing 152.

In other embodiments, the mounting support 160 can include a plurality of pieces which together form the mounting support 160. Each piece can be configured to conform to a particular portion of the perimeter of the housing 152. In particular embodiments, in which the housing 152 defines a circular cross-section, the mounting support 160 can include a plurality of partial-circular pieces (e.g., semi-circular halves or circular quadrants) positioned around the perimeter of the housing 152. In such embodiments, the pieces of the mounting support 160 can be positioned on the housing 152 and secured on the housing 152. For example, the pieces of the mounting support can be secured by coupling to adjacent pieces, or by coupling each piece of the mounting support 160 to the sidewall of the housing 152 (e.g., via welding, riveting, screwing, bolting, etc.) or to an insulation member (not shown) positioned on the housing 152 on which the piece of the mounting support is positioned (e.g., via adhesives).

In still other embodiments, the mounting support 160 can have a cross-section which matches the cross-section of the housing 152. The mounting support 160 has a width which is substantially smaller (e.g., at least about 10 times smaller) than a width of the housing 152 so that the mounting support 160 resembles a band positioned around the perimeter of the housing 152.

A surface of the mounting support 160 can be substantially flat. As used herein, the term "substantially flat" means that it is possible or de minimus surface features, for example bumps, pits, contours and the like, can be present on the surface of the mounting support 152 due to imperfections in any forming process used to form the mounting support 152 as would be understood by one of ordinary skill in the art. In particular embodiments, one or more insulating members (not shown) can be positioned between a sidewall of the housing 152 and the heat shield. The insulating members can be formed from an insulating material, for example, foam, fiberglass, polystyrene or any other suitable insulating material or combinations thereof. In some embodiments, the insulating members can include circular or partial-circular members positioned around the perimeter (e.g., concentrically) of the housing 152 spaced apart at a predetermined pitch. In particular embodiments, the mounting support 160 can be positioned on at least one insulating members such that the insulating member is positioned between the mounting support 160 and the housing 152. Furthermore, flanges can be defined on the edges of the mounting support 160. The flanges can be positioned on either side of the insulating member on which the mounting support 160 is positioned such that the flanges are adjacent to the sidewall of the housing 152.

In some embodiments, the mounting support 160 can be formed of a single piece (e.g., a seamless ring) and be configured to slide over the housing 152. In particular embodiments, in which the mounting support 160 is a circular ring-shaped member, a cross-section of the mounting support 160 can have a diameter which is in close tolerance with a diameter of the housing 152. This can allow positioning of the mounting support 160 concentrically around the housing 152 with a close tolerance.

The mounting support 160 can be made from any suitable strong and rigid material, for example metals. In one embodiment, the mounting support 160 is formed from 14 gage thickness steel (e.g., 439 stainless steel churned out in 14 gage thickness). In some embodiments, the mounting support 160 is removably coupled to the housing 152. For example, the mounting support 160 can be heated to a predetermined temperature to expand a diameter of the mounting support 152, slid over the housing 152, positioned at a predetermined location on the housing 152 (e.g., over an insulating member positioned on the housing 152) and allowed to cool. As the mounting support 160 cools and contracts, it will grip the housing 152 and will therefore be secured on the housing 152. In other embodiments, the mounting support 152 can be fixedly coupled to the housing 152, for example welded to the housing 152. In one embodiment, the mounting support 160 is welded to only one side of the housing 152.

Any number of mounting supports 160 can be positioned around the housing 152, for example two mounting supports, three mounting supports or even more. In one embodiment, a first mounting support is positioned around at least a portion of the housing. A second mounting is also positioned concentrically around at least a portion of the perimeter of the housing 152 such that the second mounting support is positioned adjacent to and spaced apart from the first mounting support. Each of the first mounting support and the second mounting support can be substantially the same as the mounting support 160 described herein.

A heat shield 170 is positioned around the perimeter of the housing 152 such that the housing 152 is positioned substantially within the heat shield 170. For example, in an arrangement where the heat shield 170 surrounds the perimeter of the housing 152 along the width of the heat shield 170, but a first side of the housing 152 orthogonal to the width of the housing 152 in which the inlet 151 is defined, and a second side of the housing 152 orthogonal to the width of the housing 152 in which the outlet 153 is defined, is not surrounded by the heat shield 170, would be considered "substantially within the heat shield". Another arrangement in which the heat shield 170 is positioned around the perimeter of the housing 153 and has a heat shield width which is greater than $¾^{th}$ of the width of the housing 152 would be considered "substantially within the heat shield". Yet another arrangement, in which the heat shield 170 is positioned around the perimeter of the housing 152 along the entire width of the housing 170 but the heat shield 170 includes slots, openings, notches or cut outs to allow accessories (e.g., sensors such as NOx sensors, temperature sensors, $O_2$ sensors, etc.) to be coupled to the housing, would be considered "substantially within the heat shield".

A portion of the heat shield 170 is disposed on and in contact with the mounting support 160. A space 171 exists between the heat shield 170 and the remaining portion of the heat shield 170 not in contact with the mounting support 160. The space 171 prevents any conductive heat transfer between the housing 152 and the heat shield 170, such that conductive heat transfer between the housing 152 and the heat shield 170 only occurs at the location where the portion of the heat shield 170 and the sidewall of the housing 152 are in contact with the mounting support 160. In other embodiments as described before herein, a plurality of insulating members can be positioned in the space between the heat shield 170 and the housing 152 to limit conductive, convective and/or radiative heat transfer between the housing and the heat shield 170.

In this manner, the heat shield 170 alone or in combination with the insulating members limits any conductive heat transfer between the SCR system 150 and the atmosphere thereby allowing retention of a significant portion of the heat generated by SCR system 150. This can help in maintaining the exhaust gas flowing through the SCR system 150 at a desired temperature to obtain an optimized catalytic conversion efficiency of the catalyst 154.

The clamp 180 is positioned around a heat shield 170 perimeter (e.g., around a circumference of the heat shield 170). The clamp 180 is positioned on the portion of the heat shield 170 located on the mounting support 160. The clamp 180 can be configured to mount the heat shield 170 on a structure, for example a chassis of a vehicle. The clamp 180 applies a clamping force on the heat shield 170. The mounting support 160 is configured to transmit the clamping force of the clamp 180 on the heat shield 170 to the housing 152. The heat shield 180 has a lower rigidity relative to the housing 152 or the mounting support 160. If the mounting support 160 is excluded, the heat shield 170 can buckle due to the clamping force. However, the mounting support 160 positioned between the heat shield 170 and the housing 152 absorbs the bulk of the clamping force. The mounting support 160 also transmits the clamping force to the housing 152, thereby preventing buckling of the heat shield 170 from the clamping force.

Figure 2:
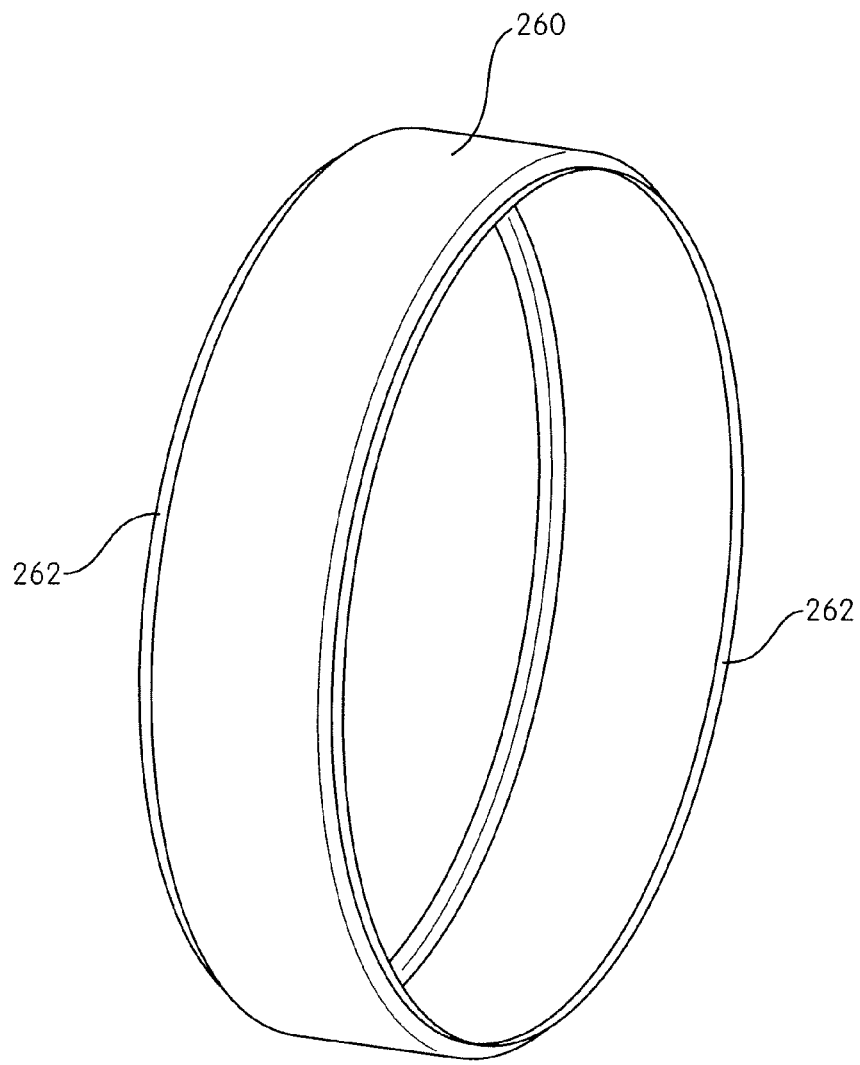
FIG. 2 is a perspective view of one embodiment of a mounting support which includes a circular ring.

FIG. 2 shows another embodiment of a mounting support 260. The mounting support 260 can be positioned around a housing of an SCR system (e.g., the housing 152 of the SCR system 150) to prevent buckling of a heat shield (e.g., the heat shield 170 or any other heat shield described herein) positioned around the housing from the force of a clamp (e.g., the clamp 180) positioned around the heat shield.

The mounting support 260 includes a circular ring-shaped member. A surface of the mounting support 260 is substantially flat. Flanges 262 are defined on edges of the mounting support 260, and are configured to be positioned on either side of an insulating member positioned on a sidewall of the housing of the SCR system. The mounting support 260 include a single piece, i.e., does not include any seams or joints. The mounting support 260 is formed from a strong and rigid material, for example 14 gage thickness stainless steel.

Figure 3:
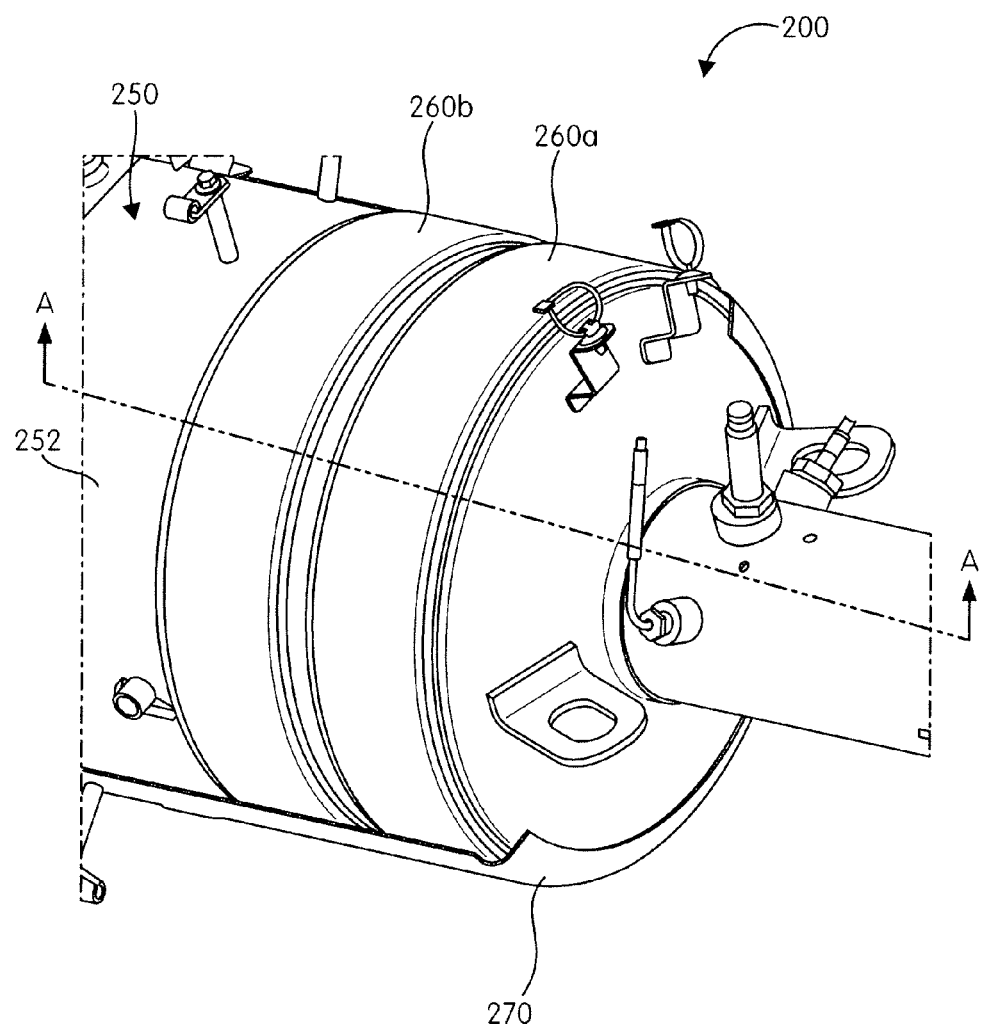
FIG. 3 is a perspective view of a portion of a particular embodiment of an aftertreatment that includes an SCR system with a portion of a heat shield positioned around a housing of the SCR system removed to show a plurality of mounting supports of FIG. 2 positioned between the housing and the heat shield according to a particular embodiment.
Figure 4:
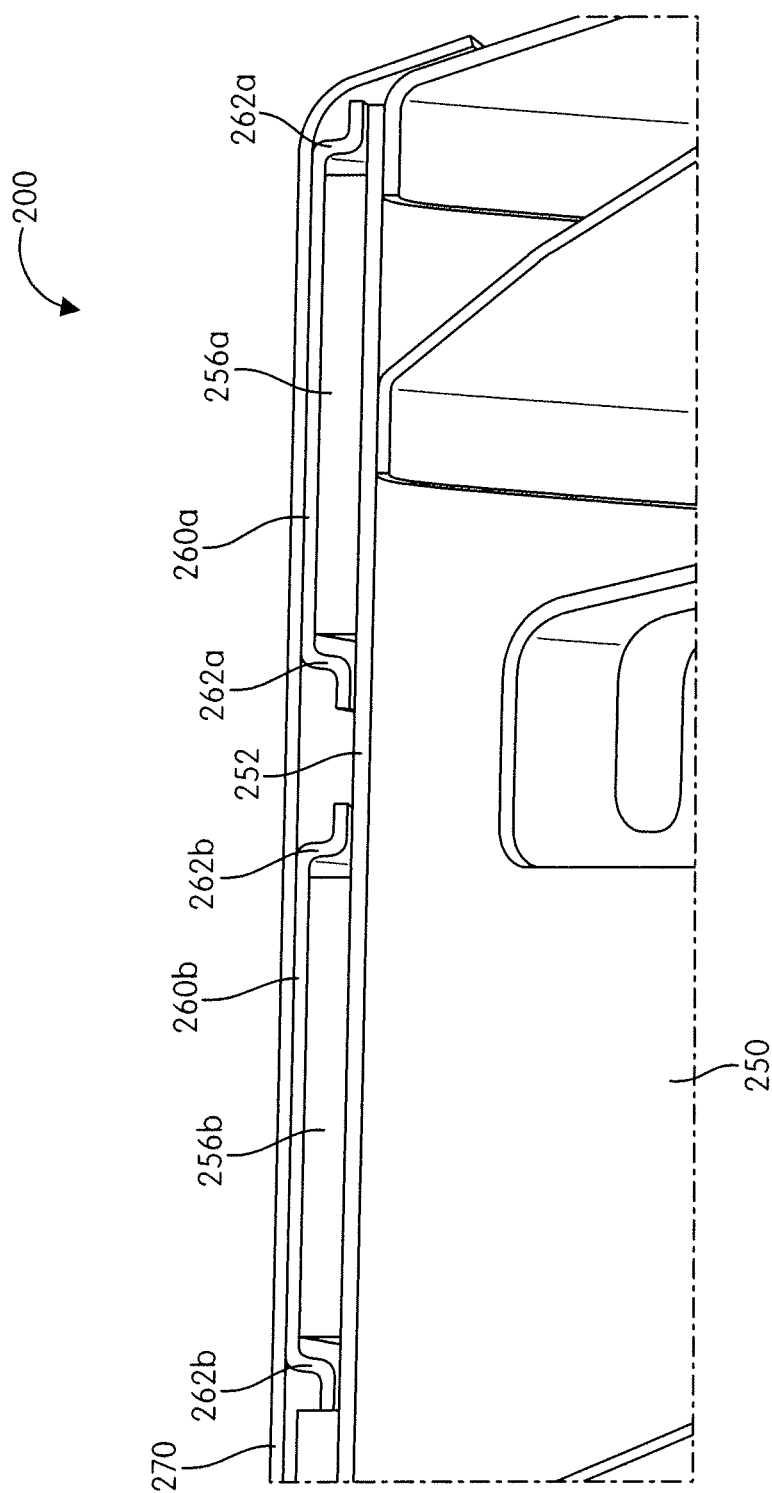
FIG. 4 is a side cross-section of a portion of the SCR system of FIG. 3, taken along the line A-A shown in FIG. 3.
Figure 5:
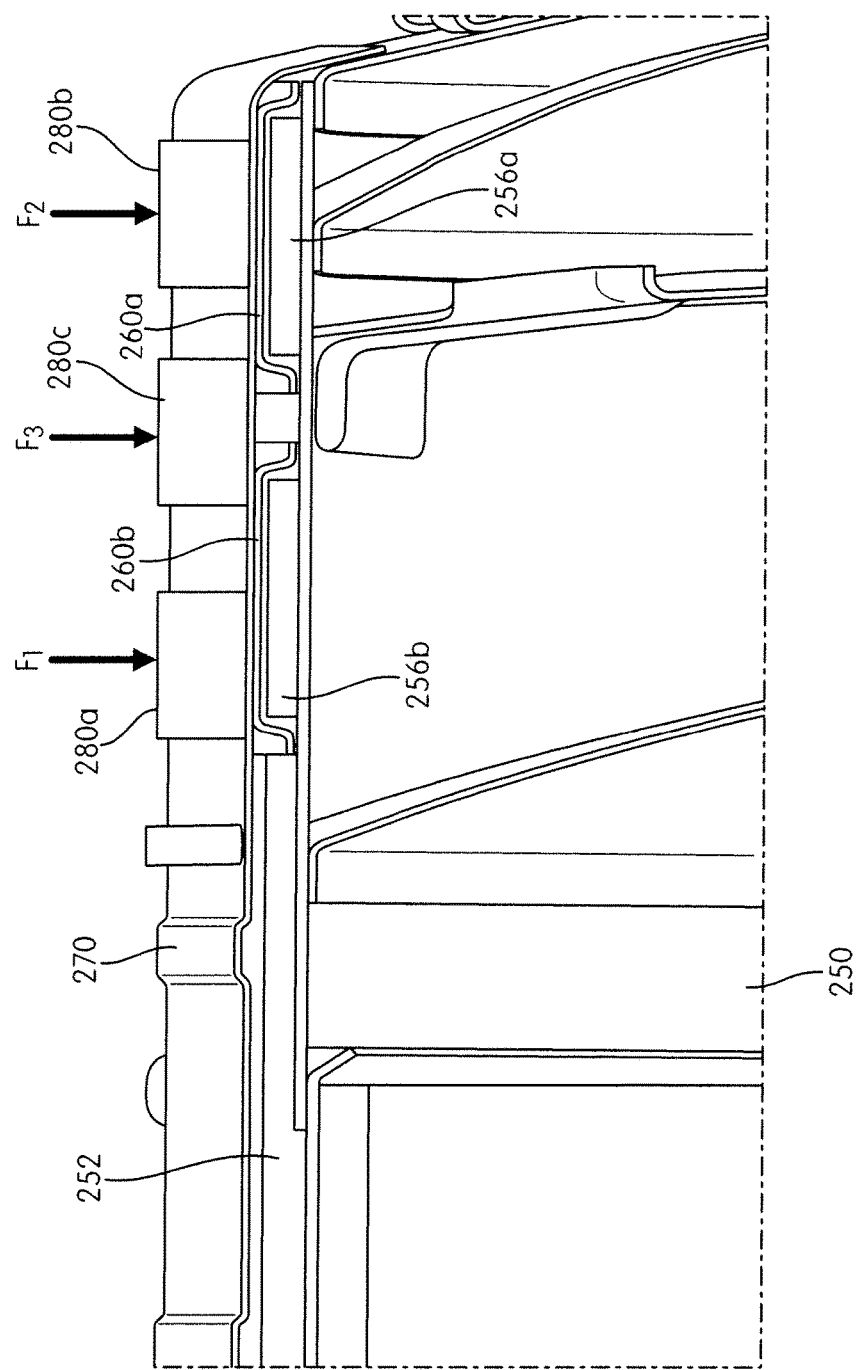
FIG. 5 is another side cross-section of a portion of the SCR system of FIG. 3, taken along the line A-A shown in FIG. 3 but also including a plurality of clamps positioned on a portion of the heat shield located on the mounting, the plurality of clamps applying a clamping force on the heat shield.

Referring to FIGS. 3-5, an exemplary aftertreatment system 200 for treating an exhaust gas is shown according to an embodiment. The aftertreatment system 200 includes a SCR system 250, a first mounting support 260a, a second mounting support 260b and a heat shield 270.

The SCR system 250 includes a housing 252 having an inlet, an outlet and defining an internal volume. The housing has a circular cross-section and having a circumference. At least one catalyst (not shown) can be positioned within the internal volume of the housing 252. The catalyst is formulated to reduce the constituents (e.g., NOx gases) of the exhaust gas. The catalyst is substantially similar to the catalyst 154 described with respect to the aftertreatment system 100 and therefore, not described in further detail herein.

The first mounting support 260a is positioned concentrically around the housing 252. The second mounting support 260b is also positioned concentrically around the housing 252 adjacent to and spaced apart from the first mounting support 260a. Each of the first mounting support 260a and the second mounting support 260b include the mounting support 260 described with respect to FIG. 2. In particular embodiments, the first mounting support 260a and the second mounting support 260b can be welded to the housing 252. In one embodiment, the first mounting support 260a and the second mounting support 260b are welded to only one side of the housing 252. First flanges 262a are defined on the edges of the first mounting support 260a and second flanges 262b are defined on the edges of the second mounting support 260b. Furthermore, a surface of the first mounting support 260a and the second mounting support 260b is substantially flat.

The heat shield 270 is positioned concentrically around the housing 252 such that the housing 252 is positioned substantially within the heat shield 270. The heat shield 270 can be substantially similar to the heat shield 170 described with respect to the aftertreatment system 100. A portion of the heat shield 270 is removed in the depiction of FIG. 3 in order to show the first mounting support 260a and the second mounting support 260b positioned concentrically between the housing 252 and the heat shield 270. A first portion of the heat shield 270 is disposed on and in contact with the first mounting support 260a, and a second portion of the heat shield 270 is disposed on and in contact with the second mounting support 260b.

FIG. 4 shows a side cross-section of a portion of the aftertreatment system 200 taken along the line A-A shown in FIG. 3. A first insulating member 256a and a second insulating member 256b are concentrically positioned on a sidewall of the housing 252. While not shown, insulating members can be concentrically positioned at a predetermined pitch along the entire length of the housing 252. The first mounting support 260a is positioned on the first insulating member 256a such that the first flanges 262a defined on the edges of the first mounting support 260a are positioned on either side of the first insulating member 256a adjacent to the sidewall of the housing 252. Similarly, the mounting support 260b is positioned on the second insulating member 256b such that the second flanges 262b defined on the edges of the second mounting support 260a are positioned on either side of the second insulating member 256b adjacent to the sidewall of the housing 252.

The first mounting support 260a and the second mounting support 260b are configured to transfer a clamping force of one or more clamps positioned around the heat shield 270 to the housing 252 to prevent the heat shield 270 from buckling due to the clamping force. FIG. 5 shows another side cross-section of the aftertreatment system 200. A first clamp 280a is positioned concentrically around the heat shield 270 and is positioned on the first portion of the heat shield 270. Additionally, a second clamp 280b is positioned concentrically around the heat shield 270 and positioned on the second portion of the heat shield 270. A third clamp 280c is also positioned concentrically around the heat shield 270 such that a third clamp first portion is positioned on the first portion of the heat shield 270 (i.e., positioned over the first mounting support 260a) and a third clamp second portion is positioned on the second portion of the heat shield 270 (i.e., positioned over the second mounting support 260b).

The first clamp 280a, the second clamp 280b, and the third clamp 280c exert a first clamping force $F_1$, a second clamping force $F_2$ and a third clamping force $F_3$, respectively, on the heat shield 270. The first mounting support 260a and the second mounting support 260b are configured to transmit the first clamping force $F_1$, of the first clamp 280a, the second clamping force $F_2$ of the second clamp 280b and the third clamping force $F_3$ of the third clamp 280c from the heat shield 270 to the housing 250 while also providing additional structural support. In this manner, the first mounting support 260a and the second mounting support 260b prevent buckling of the heat shield 270 by the clamping forces $F_1$, $F_2$ and $F_3$.

It should be appreciated that while only two mounting supports 260a and 260b are shown in FIGS. 3-5, the aftertreatment system 200 can include any number of mounting supports concentrically positioned around the housing 252 (subject to space limitations on the housing 252). Furthermore, any number of clamps can be positioned concentrically around the heat shield 272 (again, subject to space limitations), and the mounting supports can be configured to transmit the clamping force of each of the clamps from the heat shield 270 to the housing 252, while minimizing conductive heat transfer between the housing 252 and the heat shield 270. Furthermore, any number of insulating members can be positioned concentrically around the housing 252 (again, subject to space limitations) such that a mounting member (e.g., the mounting member 160, 260 or any other mounting member described herein) is positioned on each of the insulating members, as described herein.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
a selective catalytic reduction system, including:
a housing having an inlet, an outlet and defining an internal volume;
a mounting support positioned around at least a portion of a perimeter of the housing, the mounting support being located apart from the housing such that a gap is located between a sidewall of the mounting support and a sidewall of the housing;
a heat shield positioned around the perimeter of the housing such that the housing is positioned substantially within the heat shield, a portion of the heat shield disposed on and in contact with the mounting support;
a clamp positioned around a heat shield perimeter, the clamp positioned on the portion of the heat shield disposed on and in contact with the mounting support; and
an insulating member disposed in the gap between the sidewall of the mounting support and the sidewall of the housing,
wherein the mounting support is configured to transmit a clamping force of the clamp on the heat shield to the housing, the mounting support preventing buckling of the heat shield from the clamping force.

2. The aftertreatment system of claim 1, wherein at least one catalyst is positioned within the internal volume defined by the housing.

3. The aftertreatment system of claim 2, wherein the mounting support includes a C-shaped member.

4. The aftertreatment system of claim 2, wherein the housing has a circular cross-section.

5. The aftertreatment system of claim 4, wherein the mounting support includes a circular ring shaped member.

6. The aftertreatment system of claim 4, wherein the mounting support includes a plurality of partial-circular pieces.

7. The aftertreatment system of claim 2, wherein a surface of the mounting support is substantially flat.

8. The aftertreatment system of claim 2, wherein the mounting support is welded to the housing.

9. The aftertreatment system of claim 8, wherein the mounting support is welded to the housing on only one side of the housing.

10. The aftertreatment system of claim 2, wherein the mounting support comprises a single piece, and wherein the mounting support is configured to slide over the housing.

11. The aftertreatment system of claim 2, wherein the mounting support is formed from 14 gage thickness stainless steel.

12. The aftertreatment system of claim 1, wherein flanges are defined on edges of the sidewall of the mounting support, the flanges configured to be positioned on either side of the insulating member adjacent to the housing.

13. An aftertreatment system, comprising:
a selective catalytic reduction system, including:
a housing having an inlet, an outlet and defining an internal volume;
a first mounting support positioned around at least a portion of a perimeter of the housing, the first mounting support being located apart from the housing such that a gap is located between a sidewall of the first mounting support and a sidewall of the housing;
a second mounting support positioned around at least a portion of the perimeter of the housing, the second mounting support positioned adjacent to and spaced apart from the first mounting support;
a heat shield positioned around the perimeter of the housing such that the housing is positioned substantially within the heat shield, a first portion of the heat shield disposed on and in contact with the first mounting support, and a second portion of the heat shield disposed on and in contact with the second mounting support;
a first clamp positioned concentrically around a heat shield perimeter, the first clamp positioned on the first portion of the heat shield;
a second clamp positioned concentrically around the heat shield perimeter, the second clamp positioned on the second portion of the heat shield; and
a first insulating member concentrically disposed in the gap between the sidewall of the first mounting support and the sidewall of the housing,
wherein the first mounting support and the second mounting support are configured to transmit a clamping force of the first clamp and the second clamp on the heat shield to the housing respectively, the first mounting support and the second mounting support preventing buckling of the heat shield from the clamping force.

14. The aftertreatment system of claim 13, wherein at least one catalyst is positioned within the internal volume defined by the housing.

15. The aftertreatment system of claim 14, further comprising:
a third clamp positioned concentrically around the heat shield, a third clamp first portion positioned on the first of the portion of the heat shield, and a third clamp second portion positioned on the second portion of the heat shield.

16. The aftertreatment system of claim 14, wherein at least one of the first mounting support and the second mounting support includes a C-shaped member.

17. The aftertreatment system of claim 14, wherein the housing has a circular cross-section.

18. The aftertreatment system of claim 17, wherein the at least one of the first mounting support and the second mounting support include a circular ring.

19. The aftertreatment system of claim 14, wherein a surface of the mounting support is substantially flat.

20. The aftertreatment system of claim 14, wherein the second mounting support is located apart from the housing such that a gap is located between a sidewall of the second mounting support and the sidewall of the housing, and wherein a second insulating member is concentrically disposed in the gap between the sidewall of the second mounting support and the sidewall of the housing.

21. The aftertreatment system of claim 20, wherein first flanges are defined on edges of the first mounting support, the first flanges configured to be positioned on either side of the first insulating member adjacent to the sidewall of the housing.

22. The aftertreatment system of claim 21, wherein second flanges are defined on edges of the second mounting support, the second flanges configured to be positioned on either side of the second insulating member adjacent to the sidewall of the housing.

23. The aftertreatment system of claim 14, wherein the first mounting support and the second mounting support are welded to the housing.

24. The aftertreatment system of claim 23, wherein the first mounting support and the second mounting are welded to the housing on only one side of the housing.

25. An aftertreatment system, comprising:
a selective catalytic reduction system, including:
a housing having an inlet, an outlet and defining an internal volume;
a mounting support positioned concentrically around the housing, the mounting support being located apart from the housing such that a gap is located between a sidewall of the mounting support and a sidewall of the housing, the mounting support shaped in the form of a circular ring;
a heat shield positioned concentrically around the housing such that substantially all of the housing is positioned within the heat shield, a portion of the heat shield disposed on and in contact with the mounting support; and
an insulating member disposed in the gap between the sidewall of the mounting support and the sidewall of the housing,
wherein the mounting support is configured to transmit a clamping force applied on a portion of the heat shield disposed on the mounting support to the housing, the mounting support preventing buckling of the heat shield from the clamping force.

26. The aftertreatment system of claim 25, wherein at least one catalyst is positioned within the internal volume defined by the housing.

27. The aftertreatment system of claim 26, wherein a surface of the mounting support is substantially flat.

28. The aftertreatment system of claim 26, wherein flanges are defined on edges of the mounting support, the flanges configured to be positioned on either side of the insulating member adjacent to the sidewall of the housing.

29. An aftertreatment system, comprising:
a selective catalytic reduction system, including:
a housing having an inlet, an outlet and defining an internal volume;
a first mounting support positioned concentrically around the housing, the first mounting support being located apart from the housing such that a gap is located between a sidewall of the first mounting support and a sidewall of the housing, the first mounting support shaped in the form of a circular ring;
a second mounting support positioned concentrically around the housing, the second mounting support shaped in the form of a circular ring, the second mounting support positioned adjacent to and spaced apart from the first mounting support;
a heat shield positioned concentrically around the housing such that substantially all of the housing is positioned within the heat shield, a first portion of the heat shield disposed on and in contact with the first mounting support and a second portion of the heat shield disposed on and in contact with the second mounting support; and
a first insulating member disposed in the gap between the sidewall of the first mounting support and the sidewall of the housing,
wherein the first mounting support and the second mounting support are configured to transmit a clamping force applied by one or more clamps on the first portion and the second portion of the heat shield to the housing, the first mounting support and the second mounting support preventing buckling of the heat shield from the clamping force.

30. The aftertreatment system of claim 29, wherein at least one catalyst is positioned within the internal volume defined by the housing.

31. The aftertreatment system of claim 29, wherein the second mounting support is located apart from the housing such that a gap is located between a sidewall of the second mounting support and the sidewall of the housing, and wherein a second insulating member is concentrically disposed in the gap between the sidewall of the housing and the sidewall of the second mounting support.

32. The aftertreatment system of claim 30, wherein first flanges are defined on edges of the first mounting support, the first flanges configured to be positioned on either side of the first insulating member adjacent to the sidewall of the housing.

33. The aftertreatment system of claim 31, wherein second flanges are defined on edges of the second mounting support, the second flanges configured to be positioned on either side of the second insulating member adjacent to the sidewall of the housing.

* * * * *